INVENTOR.
Norman D. Phillips

United States Patent Office

3,462,343
Patented Aug. 19, 1969

3,462,343
METHOD FOR RECOVERY OF CHEMICALS FROM MAGNESIUM BASE SULPHITE DIGESTION PROCESS
Norman D. Phillips, Lancaster, Ohio, assignor to The Babcock & Wilcox Company, New York, N.Y., a corporation of New Jersey
Filed May 16, 1966, Ser. No. 550,300
Int. Cl. D21c *3/06;* C01b *17/58*
U.S. Cl. 162—36          5 Claims

ABSTRACT OF THE DISCLOSURE

A system for stripping loosely combined $SO_2$ for a sulphur containing residual liquor by spray contact with an inert gas such as steam or flue gases. The stripped $SO_2$ is subsequently combined with cooking liquor to increase the $SO_2$ content prior to the digestion of cellulosic materials.

---

This invention relates to an improvement in the recovery of chemicals from the residual liquor resulting from the digestion of cellulosic materials in a magnesium base sulphite cooking liquor and more particularly to a method of and apparatus for stripping of sulphur dioxide from the pulp residual liquor obtained from certain magnesium base cooking liquors prior to concentration and further recovery of chemicals from the residual liquor.

The use of magnesium base sulphite cooking liquors in the digestion of cellulosic materials has grown at a rapid rate in recent years. The cause of such growth has been due to many factors, such as improved yields from the raw materials, improved quality of the finished products and the ability to utilize a great variety of raw materials in producing specific products. Not the least of the advantages of magnesium base sulphite cooking procedures relates to the ability to recover the chemicals used in cooking, for reuse with only minor losses of chemicals during the recovery process.

The present invention is particularly directed to certain types of magnesium base liquors wherein the residual liquors contain loosely combined quantities of $SO_2$ which lend themselves to $SO_2$ stripping before further treatment of the residual liquor for chemical recovery. An example of the type of cooking liquors applicable to the present invention is the digestion process described in the Tomlinson Patent 3,092,535, in particular when such a pulping process is used in a two-stage cooking pattern. A somewhat similar process is known as two-stage bisulphite acid cooking is also related to the recovery procedures of the present invention. It will be noted the present invention may be applied to either full chemical cooking or semichemical cooking.

When loosely combined $SO_2$ is present in the residual liquor, such $SO_2$ may be stripped from the weak liquor immediately after the residual liquor is separated from the pulp. The stripping can be accomplished by the use of an inert gas, such as steam which is inert in this process, and by removing such loosely combined $SO_2$ prior to subsequent concentration, the quantities of chemicals handled in the chemical recovery portion of the process may be drastically reduced with a resulting reduction in the size of the recovery equipment required.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Figure 1:
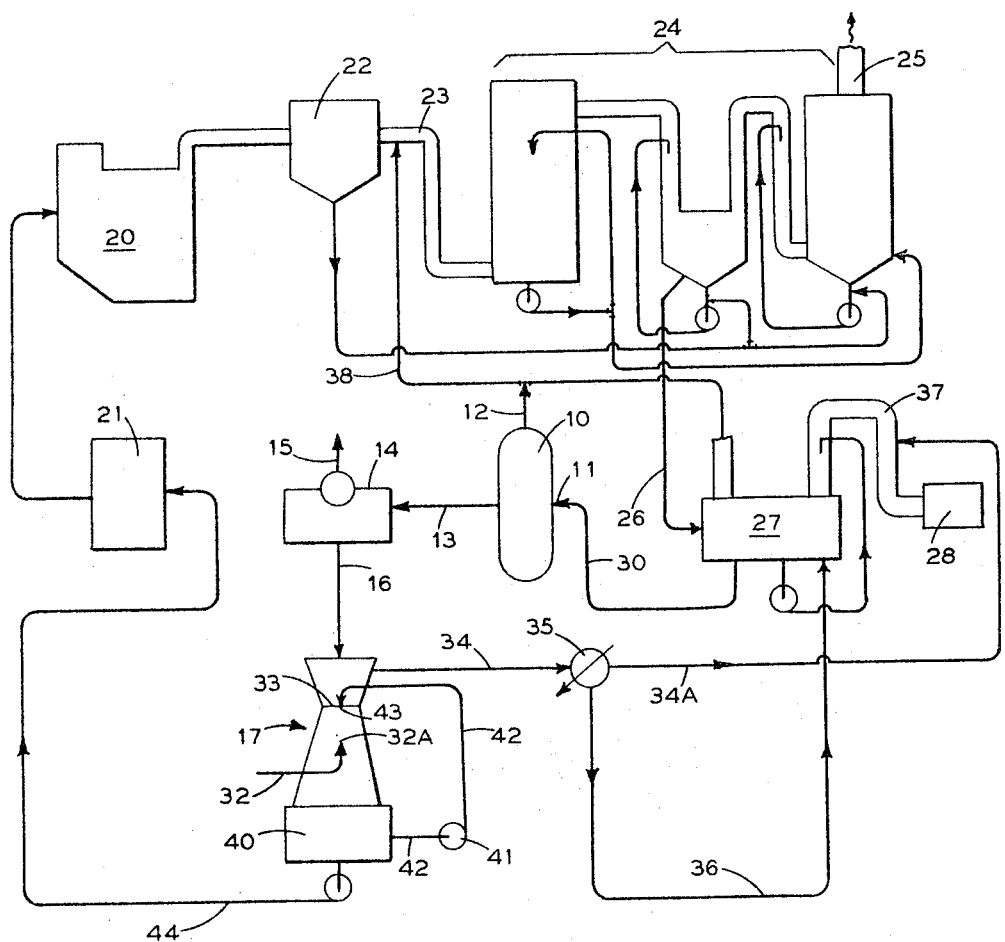
Figure 2:
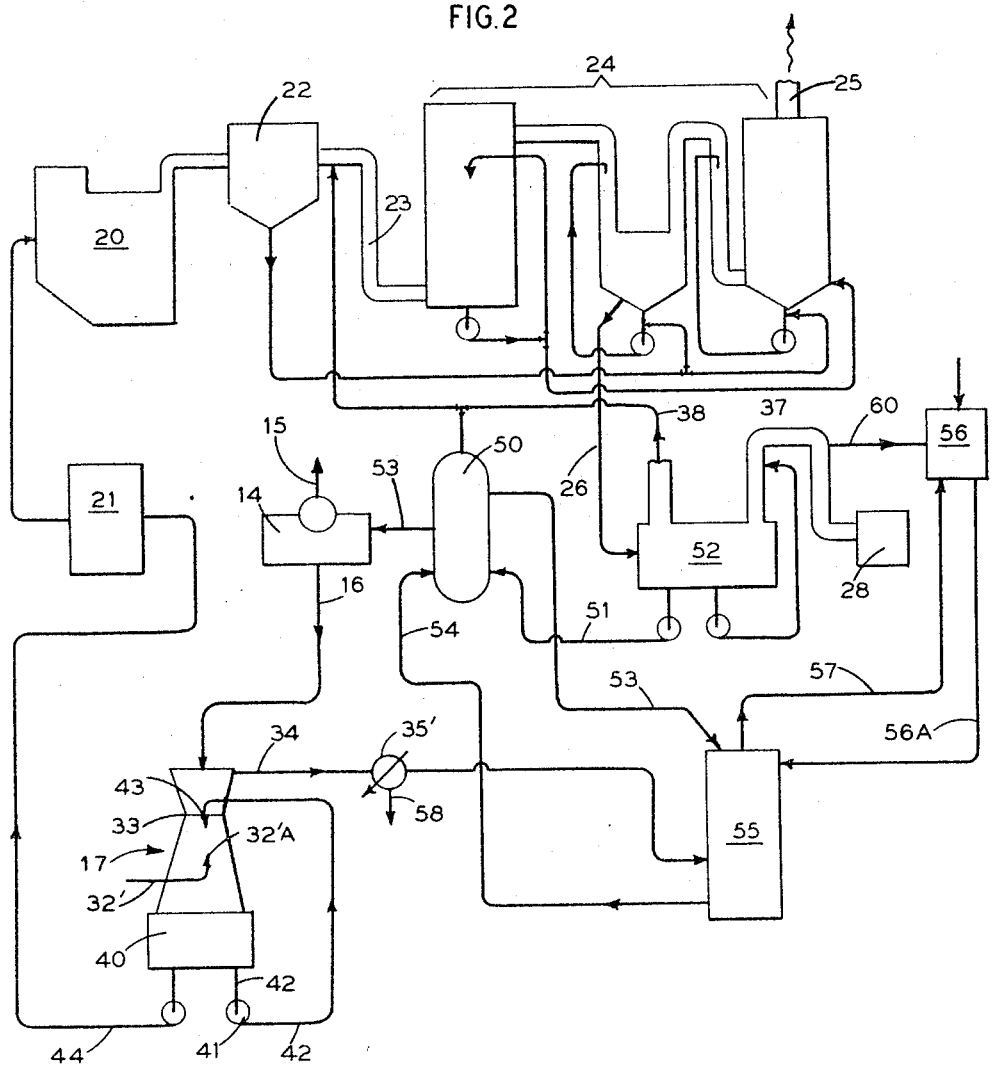

Of the drawings:

FIG. 1 is a schematic showing of a pulp digesting and chemical recovery arrangement for a magnesium base sulphite cooking and recovery system incorporating the improvement of the present invention; and FIG. 2 is a schematic arrangement of a modified magnesium base sulphite cooking and recovery system incorporating the present invention.

The embodiment of the invention shown in FIG. 1 illustrates a sulphite pulping system such as shown in U.S. Patent 3,092,535, modified to include the present invention. As shown, the pulp digester 10 is provided with a cooking liquor inlet connection 11, a vent 12 for gases and a discharge connection 13 for pulp. After the cooking process has been completed, as described in the said U.S. patent, the pulp is passed to washers 14 where the residual liquor is separated from the pulp, with the pulp being transported through a line 15 for further processing, and the weak liquor at a concentration of 10 to 15% solids passed through a pipe 16 to recovery apparatus to reform the cooking liquor.

In accordance with the present invention, the weak residual liquor obtained from the pulp washing apparatus 14 is passed through the pipe 16 to an $SO_2$ stripping or mass transfer apparatus 17 where it is passed in direct countercurrent contact with a stripping medium such as an inert gas, or steam. The purpose of the stripping or mass transfer apparatus 17, is to remove the loosely combined sulphur compounds from the liquor for discharge as gaseous sulphur dioxide to further processing apparatus with subsequent use of the sulphur dioxide in the cooking liquor, all as hereinafter described in greater detail.

After the weak residual liquor is stripped of its loosely combined sulphur compounds, the liquor is passed through a line 18 to concentrating apparatus, such as multiple effect evaporators 21, where the liquor is concentrated by evaporation to a solids content suitable for incineration in a furnace 20. As shown in FIG. 1, multiple effect evaporators 21 are utilized for concentration of the liquor by evaporation of water therefrom. It will be understood that direct contact evaporators may be used for concentration of the liquor alone or in conjunction with the multiple effect evaporators, where such direct contact apparatus may be positioned before or after the multiple effect evaporators 21.

With the residual liquor concentrated to a solids content in the range of 50–70% solids, the liquor is delivered to the furnace 20 for combustion. In burning the liquor, the chemical constituents thereof are separated into solid particle-form magnesium oxide and combustion gases containing sulphur dioxide and carbon diode. The combustion of the liquor is accompanied by the release of heat which advantageously may be used to generate steam for power purposes, for example. The magnesium oxide particles pass through the furnace and heat exchange surfaces of an associated boiler as entrained with the gases of combustion and are separated from the gases in a dust separator 22. The separated solids are discharged to necessary slaking and filtering apparatus (not shown) where the magnesium oxide is converted to a slurry containing magnesium hydroxide.

The gases of combustion leaving the separator 22 through duct 23 are thereafter passed through suitable chemical absorption equipment indicated generally at 24 where the gases are contacted by a spray liquid containing controlled quantities of magnesium hydroxide slurry for the absorption of sulphur dioxide from the gases. The absorption system is disclosed and claimed in detail in U.S. Patent 3,273,961. The gases discharged through stack 25 from the chemical absorption equipment 24 are substantially free of sulphur dioxide while an aqueous solution discharged through pipe 26 contains magnesium bisulphite and is passed to a cooking acid preparation and storage plant 27 where additional $SO_2$ is combined with the aqueous solution to form the preferred cooking liquor. The additional $SO_2$ is formed in a sulphur burner 28, for example, with the gases so formed contacting the aqueous solution received from the chemical absorption system 24. The cooking acid used in the digester 10 is obtained through pipe 30, as required, from the acid making plant 27.

In the arrangement shown in FIG. 1, the stripping medium added in the $SO_2$ stripping apparatus 17 consists of superheated steam introduced through pipe 32 and discharged upwardly by a nozzle 32A toward the restricted throat 33 of the stripping apparatus 17. The steam is passed countercurrent to the weak residual liquor so that the effluent gases leaving the stripping apparatus will consist substantially of steam and sulphur dioxide. The effluent gases are passed through a duct 34 to condenser 35 where the steam, with some contained sulphurous acid components, is condensed and passed as a liquid through a pipe 36 to the acid preparation plant 27. The $SO_2$ gas is passed through line 34A to the duct 37 connecting the sulphur burner 28 and the plant 27.

The stripping apparatus 17 may take the form of a venturi-like duct where the weak residual liquor from the pipe 16 is sprayed downwardly from a position above or adjacent the restriction or throat 33 of the apparatus. The jet of steam discharge upwardly from the nozzle 32 will pass upwardly in direct countercurrent contact with the residual liquor so as to promote release of $SO_2$ gases from the liquor. Since the time of contact between the stripping steam or other insert gas is extremely limited in apparatus of this type, it has been found desirable to recirculate residual liquor from the lower portion or sump 40 of the apparatus 17. This is accomplished by a pump 41 withdrawing liquor through pipe 42 and spraying the liquor through a nozzle 43 positioned above or adjacent the throat 33.

In the usual installation of the type described the residual liquor passed through the pipe 16 will be at a temperature of the order of 180° F. When steam is used as a stripping medium the quantity of superheated steam delivered to the nozzle 32A must be sufficient to avoid any appreciable condensation of moisture within the apparatus 17. In this connection it will be appreciated that dilution of the liquor in apparatus 17 by condensation of steam should be avoided since the diluted liquor passed from the sump 40 through pipe 44 to the evaporators 21 would increase the heat requirement in the evaporators 21 to attain the necessary concentration for incineration of the liquor in the furnace 20.

With the quantity of stripping medium selected to comply with the specific temperature requirements, for a selected rate of weak residual liquor flow through the pipe 16, the throat 33 dimensions should be such as to minimize carryover of liquor with the gaseous flow through the duct 34. I have found that a maximum flow of 10 feet per second through the throat will meet this condition. Under such conditions the stripped liquor will effectively separate from the stripping medium and accumulate in the sump 40 for delivery to the evaporators 21.

Any excess $SO_2$ containing gases passed from the sulphur burner 28 to the plant 27 which are not absorbed in the aqueous solution within the plant 27, will be discharged through the duct 38 to mingle with the gases passing through the duct 23 for absorption in the apparatus 24. The gases periodically vented from the digester 10 through the line 12 also enter the duct 38 and are thus passed through the duct 23 to the $SO_2$ absorption apparatus 24.

In the modified application of the invention shown in FIG. 2 the $SO_2$ stripping system is applied to a pulp digestion procedure generally known as two-stage acid pulping. In this procedure the digester 50 is supplied with chips in the usual manner and during the initial stage digestion of pulp occurs by contact with magnesium bisulphite cooking acid introduced through pipe 51 from the liquor fortification and storage apparatus 52. After a predetermined period at a selected temperature and pressure some of the liquor is removed from the digester 50 through pipe 53 and sulphurous acid is added to the digester 50 through pipe 54 for the second stage of the digestion process.

The sulphurous acid passed to the digester 50 through pipe 54 is accumulated in a storage tank or accumulator 55, which also receives the vapor and liquid discharged through the pipe 53 from the digester 50.

The various parts of the pulp digestion system including the chemical absorption equipment 24 is substantially the same as that described in connection with the process described in connection with FIG. 1. However, in the FIG. 2 version, utilizing second stage sulphurous acid cooking, a separate $SO_2$ and water contact tower 56 supplies acid to the accumulator 55 by way of line 56A.

As in the FIGURE 1 version of the application of the invention, the pulp prepared in the digester 50 is separated from the liquor in a pulp washer 14 with the weak residual liquor passed to the mass transfer $SO_2$ stripping apparatus 17 through pipe 16 where the loosely combined $SO_2$ is removed from the liquor by contact with an inert gas. As shown in FIG. 2 combustion gases are used for stripping the $SO_2$ with the effluent gases passed through a condenser 35′ to remove any condensable vapor therefrom, with the $SO_2$ gases thereafter passed to the $SO_2$ and water accumulator 55. The $SO_2$ gases in passing through the accumulator are largely absorbed in the solution with any excess free $SO_2$ discharging from the upper portion of the accumulator 55 through duct 57 to the $SO_2$ and water contact tower 56. The condensed vapor is passed from the condenser 35′ through pipe 58 to the sewer.

As described in connection with FIG. 1, the magnesium bisulphite containing solution delivered from the absorption equipment 24 is passed through pipe 26 to an acid fortification and storage apparatus 52 where additional $SO_2$ gases are added to the solution. The $SO_2$ gases are generated by burning sulphur in the sulphur burner 28 where any excess $SO_2$ not absorbed by the magnesium bisulphite solution will be returned to the absorption system through duct 38.

In FIG. 2, the sulphur burner 28 is ordinarily operated to produce sufficient $SO_2$ to be passed to the $SO_2$ and water absorption tower 56 through duct 60 where the sulphurous acid is formed. By controlling the amount of sulphur dioxide produced in the sulphur burner the amount of $SO_2$ added to the liquor in towers 52 and 56 can be closely controlled, with any excess delivered to the absorption system through duct 38.

In both the FIG. 1 and FIG. 2 illustrations of the application of the invention, the $SO_2$ stripping tower is shown as constituting a venturi-like device 17. The residual liquor obtained from the pulp washer 14 will ordinarily contain from 10–15% solids and will usually be at a temperature of approximately 180° F. The liquor is sprayed into the upper end portion of the venturi by way of pipe 16 while the stripping gas, steam as illustrated in FIG. 1, and combustion gases as illustrated in FIG. 2 is injected in an upward direction in direct contact with the downwardly moving spray of residual liquor. As shown, the $SO_2$ stripping device is further provided with nozzles associated with the incoming weak residual liquor so that a controlled quantity of recirculated liquor may be injected by way of pipe 42 into the stream of spray liquid descending through the stripping device 17. Ordinarily the gas or vapor will be delivered to the device with sufficient temperature to maintain the pressure and temperature of the mixture of inert gas and $SO_2$ gas above the saturation temperature of the mixture discharged through duct 34. In this manner the effluent gases discharged to the condenser 35 or 35' will be at a temperature sufficient to maintain the water content therein above saturation temperature at the pressure involved. The recirculation rate of recirculated liquor will be sufficient to insure maximum stripping of $SO_2$ from the residual liquor so that ordinarily the magnesium to $SO_2$ mol ratio will be of the order of 1 to 1 or 1.1 to 1 when the liquor is withdrawn through pipe 44 from the stripping apparatus 17.

While the invention has been illustrated as applied to a process for magnesium base cooking, and chemical recovery, it will be understood the invention is also useful in any application where it is necessary or desirable to concentrate the residual liquor in multiple effect evaporators. Stripping the excess $SO_2$ from the residual liquor reduces the acidity and corrosive effect of the residual liquor. After the weak residual liquor has been stripped it will no longer be necessary to add a neutralizing agent such as magnesium hydroxide to the liquor delivered to the multiple effect evaporators 21.

The $SO_2$ stripping procedure of the present invention also advantageously reduces the material quantities passed through the recovery system of a complete recovery unit. As a result the physical dimensions of the $SO_2$ absorption equipment 24 may be reduced over that customarily utilized when neutralizing agents are added to the residual pulp liquor passed through the multiple effect evaporators and thereafter delivered to the chemical recovery furnace 20.

What is claimed is:

1. In a process of preparing pulp from a cellulosic raw material which comprises pulping said raw material in a magnesium base sulphite cooking liquor, separating the residual liquor from the pulp, concentrating the residual liquor, burning the concentrated liquor with the production of heat, magnesium oxide and gaseous products including sulphur dioxide, forming a slurry containing magnesium hyroxide from said recovered magnesium oxide, contacting the gaseous products of liquor combustion with the magnesium hydroxide slurry to form an aqueous solution containing magnesium bisulphite, passing said aqueous solution containing magnesium bisulphite to a cooking liquor storage zone, the improvement which comprises stripping loosely combined sulphur dioxide from said separated residual liquor prior to said residual liquor concentration by direct contact with superheated steam from an external source, passing said steam with the stripped gaseous sulfur dioxide to a sulphur dioxide absorption zone to remove the sulphur dioxide therefrom in an absorption solution, and passing the stripped sulphur dioxide from said absorption zone with said aqueous solution to a cooking liquid storage zone.

2. In a process according to claim 1, wherein a condenser is used to remove condensed water from the mixture of stripped $SO_2$ and steam before the stripped $SO_2$ is absorbed in the absorption solution.

3. In a process according to claim 2, wherein the condensed steam is passed to said bisulphite containing cooking liquor storage zone to mix with the cooking liquor.

4. In a process according to claim 1, wherein the aqueous solution containing magnesium bisulphite formed by the contact between the gaseous products of liquor combustion and the magnesium hydroxide slurry is passed through a separate zone in contact with sulphur dioxide gases formed by burning sulphur to increase the sulphur dioxide content of the aqueous solution, and the stripped sulphur dioxide is added to the aqueous solution in forming the cooking liquor.

5. In a process according to claim 1, wherein the pulping of said raw material further includes the addition of sulphurous acid and the stripped sulfur dioxide is separately absorbed in water in forming said sulphurous acid.

References Cited

UNITED STATES PATENTS 2,385,955  10/1945  Tomlinson _____ 162—36

HOWARD R. CAINE, Primary Examiner

U.S. Cl. X.R.

162—86